United States Patent [19]

Kamikubo

[11] Patent Number: 5,128,063

[45] Date of Patent: Jul. 7, 1992

[54] ZNO:ZN PHOSPHOR FOR VACUUM FLUORESCENT DISPLAY

[75] Inventor: Hayato Kamikubo, Kagoshima, Japan

[73] Assignee: NEC Corporation, Tokyo, Japan

[21] Appl. No.: 790,171

[22] Filed: Nov. 12, 1991

[30] Foreign Application Priority Data

Nov. 9, 1990 [JP] Japan .................................. 2-305255

[51] Int. Cl.$^5$ .............................................. C09K 11/68
[52] U.S. Cl. ........................... 252/301.5; 252/301.6 R; 313/496
[58] Field of Search ..................... 252/301.5, 301.6 R; 313/496

[56] References Cited

U.S. PATENT DOCUMENTS

| 2,408,475 | 10/1946 | Nickle | 252/301.6 R |
| 4,181,627 | 1/1980 | Weiher et al. | 252/301.6 R |
| 4,468,589 | 8/1984 | Hikida et al. | 252/301.6 R |
| 4,791,336 | 12/1988 | Morimoto et al. | 252/301.6 R |

FOREIGN PATENT DOCUMENTS

| 59-43089 | 3/1984 | Japan | 252/301.6 R |
| 59-71385 | 4/1984 | Japan | 252/301.6 R |
| 60-92385 | 5/1985 | Japan . | |

Primary Examiner—Jack Cooper
Attorney, Agent, or Firm—Burns, Doane, Swecker & Mathis

[57] ABSTRACT

A phosphor for a vacuum fluorescent display composed of a ZnO:Zn phosphor material mixed with tungsten oxide powder and Zn microfine powder, each of which is in the range of 0.01 weight % to 3 weight %.

3 Claims, 2 Drawing Sheets

○ PHOSPHOR OF PRIOR ART
● PHOSPHOR OF INVENTION
△ PHOSPHOR MIXED WITH ONLY TUNGSTEN OXIDE

ZNO:ZN PHOSPHOR FOR VACUUM FLUORESCENT DISPLAY

BACKGROUND OF THE INVENTION

1. Field of the Invention

The present invention relates to a phosphor for use in a vacuum fluorescent display, and more specifically to a ZnO:Zn type phosphor which is used in a vacuum fluorescent display and which has an increased initial luminance and a decreased drop of luminance with time.

2. Description of Related Art

In the prior art, a ZnO:Zn type phosphor has the most excellent luminous efficiency among various phosphors used in a vacuum fluorescent display. This vacuum fluorescent display is one type of evacuated display tube in which the anodes are coated with a phosphor that glows when electrons from the cathode strike it, to create a display. In the current situation in which the vacuum fluorescent display is widely used in a video tape recorder and as a display means in automobiles, the ZnO:Zn phosphor has already become one indispensable material for the vacuum fluorescent display.

The ZnO:Zn phosphor used in the conventional vacuum fluorescent display is an n-type semiconductor of oxygen-deficient type, and therefore, has gas absorption property (absorbing $H_2O$, $CO_2$, CO, $O_2$, etc.) which is as high as it is used as a gas sensor material. Because of this property, the ZnO:Zn phosphor absorbs various gases in the process of a manufacturing the vacuum fluorescent display, and in particularly, in a heat treatment process of the manufacturing process (sintering of the ZnO:Zn phosphor, and sealing and evacuation of the vacuum fluorescent display), a surface of the ZnO:Zn phosphor is oxidized in comparison with a condition adjusted as the phosphor material. As a result, an initial luminance was low.

In operation, gas is emitted from constitution members of the vacuum fluorescent display, due to a heating caused by an electric power consumption, or a use environment temperature. The emitted gas is absorbed by a getter, but a portion of the emitted gas remains within the vacuum fluorescent display. On the other hand, as mentioned above, since the ZnO:Zn phosphor has an intense gas absorption property, the ZnO:Zn phosphor absorbs the remaining emitted gas, and as a result, the luminance decreases with time.

In order to improve the characteristics of the ZnO:Zn phosphor, various researches has been made and are being made at present. Japanese Patent Application Laid-open No. Sho 58-40746 proposed that tungsten oxide powder is mixed into the ZnO:Zn phosphor. This was effective in preventing the "decrease of luminance with time". However, the initial luminance rather dropped.

SUMMARY OF THE INVENTION

Accordingly, it is an object of the present invention to provide a ZnO:Zn phosphor for use in a vacuum fluorescent display, which has overcome the above mentioned defect of the conventional one.

Another object of the present invention is to provide a ZnO:Zn phosphor for use in a vacuum fluorescent display, which has an increased initial luminance and a decreased "drop of luminance with time".

The above and other objects of the present invention are achieved in accordance with the present invention by a phosphor for a vacuum fluorescent display composed of a ZnO:Zn phosphor material mixed with tungsten oxide powder and metal Zn microfine powder.

Preferably, the ZnO:Zn phosphor material contains the tungsten oxide powder in the range of 0.01 weight % to 3 weight % and the Zn microfine powder in the range of 0.01 weight % to 3 weight %.

In a preferred embodiment, the ZnO:Zn phosphor material is in the form of a powdered material having an averaged particle diameter in the range of 4 μm to 5 μm. The tungsten oxide powder has an averaged particle diameter on the order of 0.5 μm, and the Zn microfine powder has an averaged particle diameter on the order of 0.2 μm. The ZnO:Zn phosphor material contains 0.2 weight % of tungsten oxide powder and 0.7 weight % of Zn microfine powder.

The above and other objects, features and advantages of the present invention will be apparent from the following description of preferred embodiments of the invention with reference to the accompanying drawings.

DESCRIPTION OF THE PREFERRED EMBODIMENTS

Figure 1:
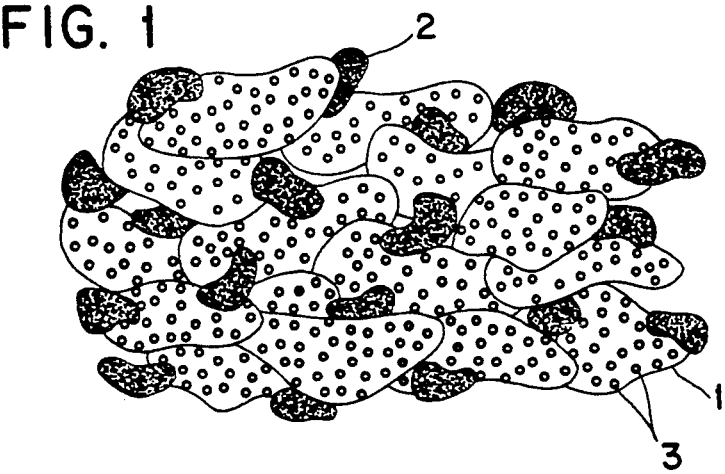
FIG. 1 is a diagrammatic view illustrating a mixed condition of a ZnO:Zn phosphor in accordance with the present invention.
Figure 2:
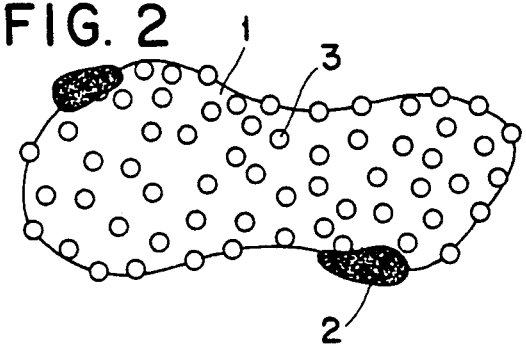
FIG. 2 is an enlarged diagrammatic view illustrating one ZnO:Zn phosphor particle bonded with tungsten particles and Zn microfine particles.

As shown in FIGS. 1 and 2, the ZnO:Zn phosphor in accordance with the present invention is mainly composed of a powdered ZnO:Zn phosphor material 1 having an averaged particle diameter in the range of 4 μm to 5 μm, and contains 0.2 weight % of tungsten oxide powder 2 having an averaged particle diameter on the order of 0.5 μm, and 0.7 weight % of Zn microfine powder 3 having an averaged particle diameter on the order of 0.2 μm.

The ZnO:Zn phosphor powder, the tungsten oxide powder and the Zn microfine powder were mixed together and agitated in an organic solvent, and dispersed by an ultrasonic wave. Thereafter, the dispersed mixture was mixed with an organic binder and agitated. Thus, a phosphor paste was obtained. A vacuum fluorescent display was manufactured in a conventional manner by using the phosphor paste thus obtained.

With addition of the Zn microfine powder 3, some of the Zn microfine particles 3 are entrapped into a portion of the ZnO:Zn phosphor particles. Some of the entrapped Zn microfine particles 3 reacts with excessive oxygen existing at a surface of the ZnO:Zn phosphor particles, and entraps the oxygen by the fact that Zn becomes oxide. On the other hand, unreacted ones of the entrapped Zn microfine particles 3 are maintained the surface of the ZnO:Zn phosphor particles. As a result, the surface of the ZnO:Zn phosphor particles is maintained in a Zn rich condition. Thus, the degree of oxidation in the ZnO:Zn phosphor caused in the sintering process can be greatly reduced, and therefore, the deterioration of the ZnO:Zn phosphor can be remarkably prevented. Accordingly, a crystalline structure of the surface of the phosphor is maintained in substantially the same condition as a condition before the sintering process.

Figure 3:
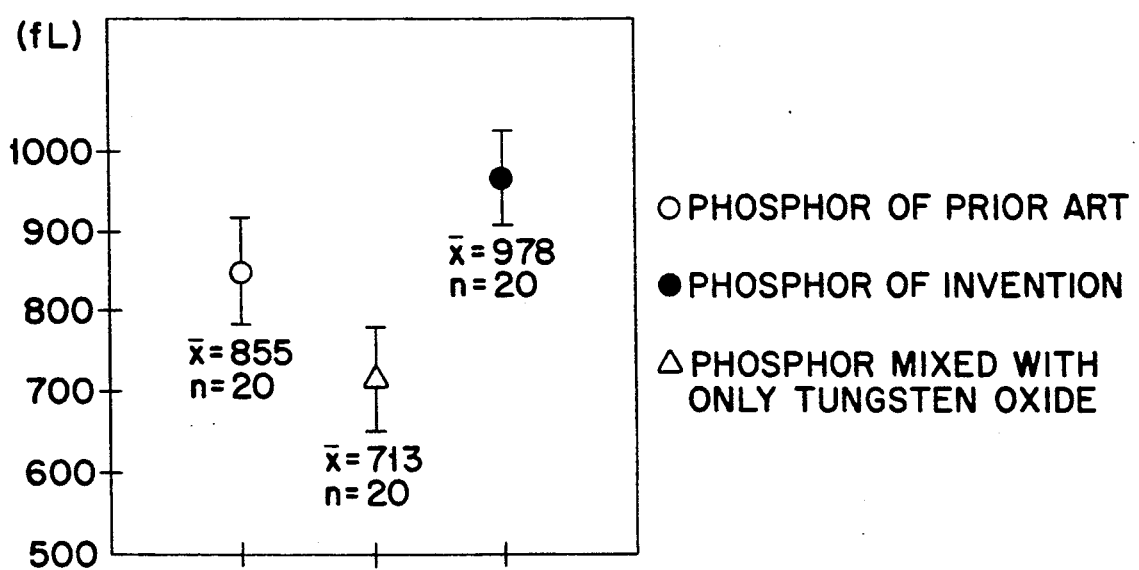
FIG. 3 is a graph showing the initial luminance of the ZnO:Zn phosphor in the prior art, the ZnO:Zn phosphor of the present invention and the ZnO:Zn phosphor mixed with only the tungsten powder.

FIG. 3 is a graph showing the initial luminance of the ZnO:Zn phosphor in the prior art, the ZnO:Zn phosphor mixed with only the tungsten powder, and the above mentioned embodiment of the ZnO:Zn phosphor in accordance with the present invention. In FIG. 3, the ordinate indicates the foot-lambert (fL).

It will be apparent from the FIG. 3 that the above mentioned embodiment of the ZnO:Zn phosphor in accordance with the present invention has an initial luminance remarkably higher than those of the ZnO:Zn phosphor in the prior art and the ZnO:Zn phosphor mixed with only the tungsten powder.

Figure 4:
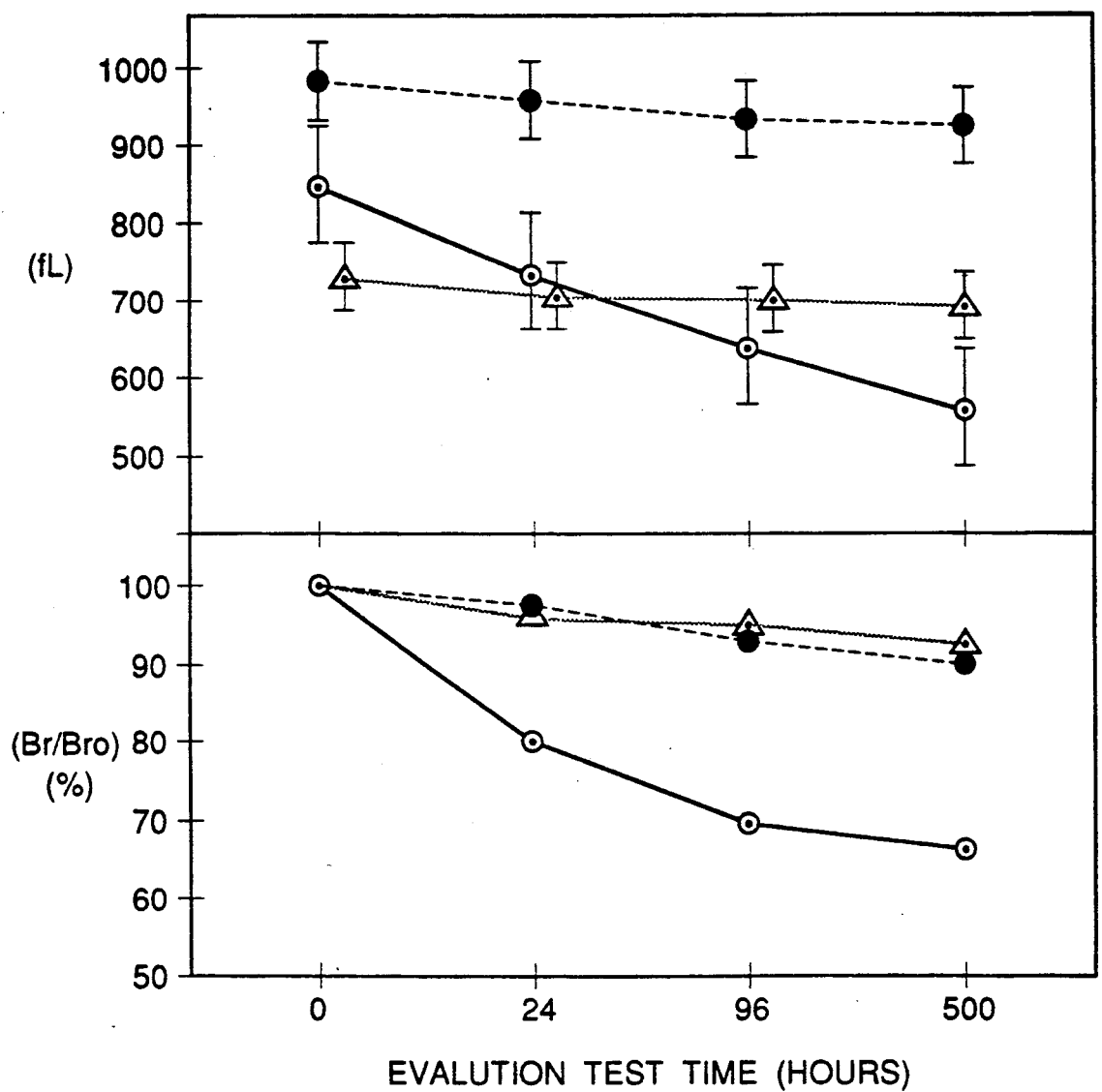
FIG. 4 is a graph showing the "change of luminance with time" of the ZnO:Zn phosphor in the prior art, the ZnO:Zn phosphor mixed with only the tungsten powder.

FIG. 4 is a graph showing the "change of luminance with time" under a high temperature evaluation test of the ZnO:Zn phosphor in the prior art, the ZnO:Zn phosphor mixed with only the tungsten powder, and the above mentioned embodiment of the ZnO:Zn phosphor in accordance with the present invention. In an upper graph of FIG. 4, the ordinate indicates the foot-lambert (fL), and in a lower graph of FIG. 4, the ordinate indicates the ratio (%) of the brightness (Br) to the initial brightness (Bro).

It will be apparent from the FIG. 4 that the "change of luminance with time" in the above mentioned embodiment of the ZnO:Zn phosphor in accordance with the present invention is remarkably small in comparison with the ZnO:Zn phosphor in the prior art. On the other hand, the ZnO:Zn phosphor mixed with only the tungsten powder is relatively small in the "change of luminance with time", but the initial luminance itself is small.

The above mentioned increased "initial luminance" and improved "drop of luminance with time" of the ZnO:Zn phosphor in accordance with the present invention can be obtained by mixing the tungsten oxide powder in the range of 0.01 weight % to 3 weight % and the Zn microfine powder in the range of 0.01 weight % to 3 weight % into the ZnO:Zn phosphor powder.

The invention has thus been shown and described with reference to the specific embodiments. However, it should be noted that the present invention is in no way limited to the details of the illustrated structures but changes and modifications may be made within the scope of the appended claims.

I claim:

1. A phosphor composition for a vacuum fluorescent display mainly composed of a ZnO:Zn phosphor material, 0.01-3 weight % of tungsten oxide powder and 0.01-3 weight % of microfine metal Zn powder capable of being entrapped into the ZnO:Zn phosphor material and reacting with oxygen on the surface thereof, the phosphor composition exhibiting a higher initial luminance than said phosphor composition absent the microfine metal Zn powder.

2. A phosphor composition for a vacuum fluorescent display claimed in claim 1 wherein said ZnO:Zn phosphor material is in the form of a powdered material having an average particle diameter in the range of 4 μm to 5 μm; said tungsten oxide powder has an average particle diameter on the order of 0.5 μm; and said microfine metal Zn powder has an average particle diameter on the order of 0.2 μm.

3. A phosphor composition for a vacuum fluorescent display claimed in claim 2 wherein said tungsten oxide powder is present in an amount of 0.2 weight % and said microfine metal Zn powder is present in an amount of 0.7 weight %.

* * * * *